US007194659B2

(12) United States Patent
Buchanan, Jr. et al.

(10) Patent No.: US 7,194,659 B2

(45) Date of Patent: Mar. 20, 2007

(54) METHOD AND SYSTEM FOR DETECTION AND CORRECTION OF ENTRANCE INTO AN IMPROPER MBR STATE IN A COMPUTER SYSTEM

(75) Inventors: William W. Buchanan, Jr., Wake Forest, NC (US); Simon C. Chu, Chapel Hill, NC (US); Peter Thomas Donovan, Cary, NC (US); Benjamin Russell Grimes, Zebulon, NC (US); Gregory Brian Pruett, Raleigh, NC (US); David B. Rhoades, Raleigh, NC (US); Paul Brian Tippet, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 10/315,807

(22) Filed: Dec. 10, 2002

(65) Prior Publication Data

US 2004/0153840 A1 Aug. 5, 2004

(51) Int. Cl.
*G06F 11/00* (2006.01)

(52) U.S. Cl. ........................................................ 714/36

(58) Field of Classification Search .................. 714/36, 714/6, 1, 2

See application file for complete search history.

(56) References Cited

U.S. PATENT DOCUMENTS 5,509,120 A * 4/1996 Merkin et al. .............. 713/200
5,537,540 A 7/1996 Miller et al. ........... 395/183.14
5,694,600 A * 12/1997 Khenson et al. ............... 713/2
5,701,477 A 12/1997 Chejlava, Jr. ............... 395/652
5,809,230 A 9/1998 Pereira ....................... 395/186
5,974,567 A * 10/1999 Dickson et al. ............... 714/27
6,016,402 A * 1/2000 Thomas et al. ................ 710/8
6,272,626 B1 * 8/2001 Cobbett ......................... 713/2
6,421,792 B1 * 7/2002 Cromer et al. ................ 714/36
6,430,663 B1 * 8/2002 Ding .......................... 711/162
6,449,716 B1 * 9/2002 Rickey .......................... 713/2
6,473,655 B1 * 10/2002 Gould et al. ................... 700/5
6,542,979 B1 * 4/2003 Eckardt ..................... 711/173
6,560,701 B1 * 5/2003 Berstis et al. .................. 713/2
6,640,316 B1 * 10/2003 Martin et al. ................. 714/36
6,658,563 B1 * 12/2003 Ice et al. ........................ 713/2
6,748,553 B2 * 6/2004 McBride et al. .............. 714/15
6,792,556 B1 * 9/2004 Dennis .......................... 714/6
6,862,681 B2 * 3/2005 Cheston et al. ................ 713/2
6,931,522 B1 * 8/2005 Raghavan et al. ............. 713/2

OTHER PUBLICATIONS

IBM Research Disclosure, vol. 42, No. 419, Article 41997, "Backup Master Boot Record for virus recovery," Mar. 1999.
IBM Technical Disclosure Bulletin, vol. 36, No. 6B, pp. 295-298, "Auto-Bios Image Configurator," Jun. 1993.

* cited by examiner

*Primary Examiner*—Robert W Beausoliel
*Assistant Examiner*—Amine Riad
(74) *Attorney, Agent, or Firm*—Sawyer Law Group LLP

(57) ABSTRACT

Aspects for detection and correction of entrance into an improper master boot record (MBR) state in a computer system are described. The aspects include providing a proxy MBR at a predetermined location on a storage device of a computer system to provide a proxy MBR. The proxy MBR is then utilized during a restart operation. An original MBR maintained at an original location on the storage device is then utilized during a reboot operation when the utilization of the proxy MBR is unsuccessful.

16 Claims, 2 Drawing Sheets

METHOD AND SYSTEM FOR DETECTION AND CORRECTION OF ENTRANCE INTO AN IMPROPER MBR STATE IN A COMPUTER SYSTEM

FIELD OF THE INVENTION

The present invention relates to automatic detection and correction of entrance into an improper MBR state in a computer system.

BACKGROUND OF THE INVENTION

During a boot operation of a computer system, a power-on self-test (POST) is performed, and an operating system is located from among the disk drives of the computer system. The Master Boot Record (MBR) is the information in the first sector of the bootable hard drive that identifies how and where an operating system is located so that it can be booted (loaded) into the computer's main memory or RAM (random access memory). The MBR is also sometimes called the "partition sector" or the "master partition table" because it includes a table that locates each partition that the hard disk has been formatted into. In addition to this table, the MBR also includes a program that reads the boot sector record of the partition containing the operating system to be booted into RAM. In turn, that record contains a program that loads the rest of the operating system into RAM. This information is critical, because without it, the computer system cannot be run and files cannot be found.

Situations exist where the MBR must be modified to run maintenance routines. Examples of this include modifying the boot loader to boot into a different operating system (OS) partition, such as DOS versus a Linux partition, or use of third party utility programs that modify the MBR for system maintenance, such as PowerQuests's VIRTUAL FLOPPY, which allows for an OS, such as DOS or Linux, to be booted from a non-DOS-based system (e.g., WIN NT's NTFS (NT file system).

A problem with programs which modify the MBR is the potential that they will prohibit a system from properly booting if some unforeseen event occurs. Examples of these events could be code bugs, incompatibilities with other applications, a system hang during the virtual floppy boot, etc. In the VIRTUAL FLOPPY application, for instance, the MBR is modified while the native protected mode OS is running. The system then shuts down and an IPL (initial program load) is forced. During this IPL, the BIOS (basis input/output system) reads the MBR into memory, validates it for correctness, and passes control to the partition entry which is labeled active. If the MBR either does not have the correct bytes in the correct location, has an invalid partition entry, has no active partition, or has a problem within the code which hooks this boot process, the system will stop with an error message (i.e., 'no bootable partition', 'error loading OS', etc.) or will just hang in a non-operating state. Furthermore, if the VIRTUAL FLOPPY maintenance routine hangs due to an errant condition, the system is stuck in this mode, because it cannot undo itself.

Manual recovery operation, generally with a bootable floppy, CD, etc., is one way of overcoming the hang situation. If a MBR gets corrupted, recovery diskettes can be used locally to restore the system back to its prior state. Remote restoration is not possible, because an Enterprise Software Distribution package requires the OS to be up and running and is managed via an agent. If there is a problem with a MBR modification process due to some undetected incompatibility, all systems (servers, clients, POS registers, etc.) could be put into a remotely unrecoverable state. This risk may prohibit administrators from performing any system maintenance routines remotely, which implement a VIRTUAL FLOPPY by modifying the MBR.

Accordingly, a need exists for an automated detection and correction mechanism in the event that a system gets into an improper or corrupted MBR state. The present invention addresses such a need.

SUMMARY OF THE INVENTION

The present invention provides aspects for detection and correction of entrance into an improper master boot record (MBR) state in a computer system. The aspects include providing a proxy MBR at a predetermined location on a storage device of a computer system. The proxy MBR is then utilized during a restart operation. An original MBR maintained at an original location on the storage device is then utilized during a reboot operation when the proxy MBR utilization is unsuccessful.

Through the present invention, a computer system can successfully self-heal from its entrance into a corrupted or improper MBR state by automatically detecting an improper MBR state and correcting system operation by utilizing an unmodified MBR. In this manner, better efficiency and reliability is achieved while avoiding the need to perform more manual and cumbersome recovery activities. These and other advantages of the present invention will become readily apparent from the following detailed description and accompanying drawings.

DETAILED DESCRIPTION OF THE INVENTION

The present invention relates to detection and correction of entrance into an improper MBR state in a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
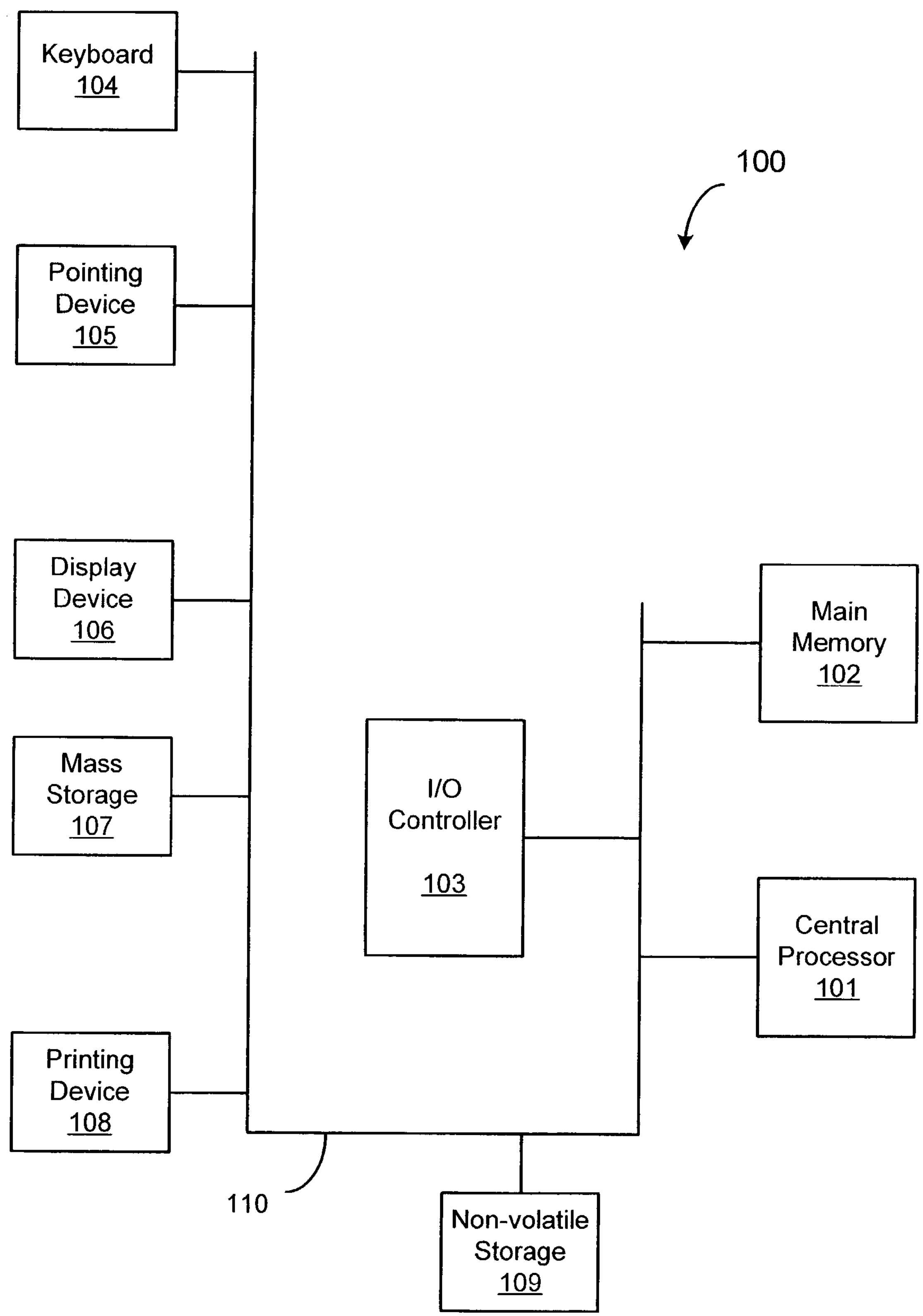
FIG. 1 illustrates a computer system suitable for embodying the present invention.

The present invention is suitably embodied in a computer system such as system 100 shown in FIG. 1 which includes: a central processor 101; a main memory 102; an input/output controller 103; a keyboard 104; a pointing device 105 (e.g., a mouse, trackball, pen device, or the like); a display device 106; a mass storage device 107 (e.g., a hard disk); and non-volatile storage 109 (e.g., NVRAM, CMOS, service processor, etc.). Additional input/output devices, such as a printing device 108, may be included in the system 100 as desired. As shown, the various components of system 100 communicate through a system bus 110 or similar architecture. The system 100 suitably represents an IBM-compatible personal computer system, available from a variety of vendors, including IBM Corporation, Armonk, N.Y. System 100 operates in accordance with an operating system and one or more application programs stored on computer readable mediums, as is well understood by those skilled in the art.

Figure 2:
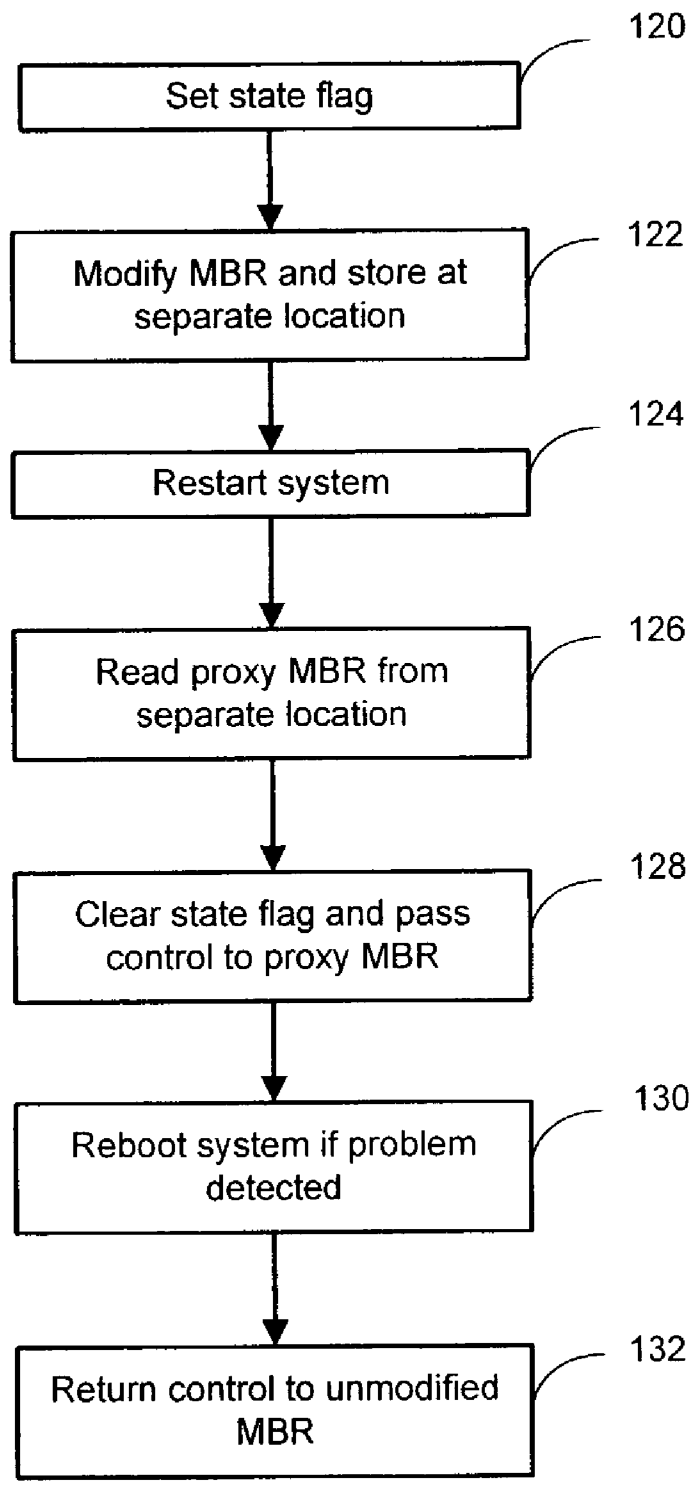
FIG. 2 illustrates a method for automatic detection and correction of entrance into an improper MBR state in the computer system of FIG. 1.

In accordance with the present invention, detection and correction of a computer system in an improper or corrupted MBR state is provided. Referring to the flow diagram of FIG. 2, the detection and correction initiates with a system call using a device driver that will set a state flag in nonvolatile storage (e.g., storage 109, FIG. 1), as is well understood by those skilled in the art (step 120). An application program wanting to modify the MBR utilizes a sector on Track 0 on the mass storage device 107 (e.g., LBA (logical block address) 0 to 62 or Sectors 2–63 on Cyl 0, Head 0) and stores the modification data as if it were the MBR (e.g., at Sector 63) (step 122). A normal OS shutdown call is then issued and the system restarts (step 124). During the IPL process when the system restarts, the BIOS detects that the state flag is set and reads the modified sector (e.g., at Sector 63) into memory instead of reading the sector for the unmodified MBR (i.e., at Cyl 0, Hd 0, Sect 1) (step 126). Thus, the information from the modified sector is treated as if it were the only MBR. The normal tests are then performed on the modified sector (i.e., proxy MBR), and the BIOS clears the state flag, sets up a system watchdog timer, and then passes control to the proxy MBR (step 128). If a problem is detected, (i.e., a hang occurs or an error message which causes a hang occurs), then the system watchdog timer is invoked and the system restarts automatically (step 130). Since the original MBR was never modified and the state flag is now cleared, the system loads the sector for the original MBR on the restart, thus returning control to the protected mode OS (step 132). In this manner, the system automatically detects an improper MBR state and corrects system operation by utilizing an unmodified MBR to maintain proper system operation and avoid having to manually recover from a hang due to a problem with attempted use of a modified MBR.

In an alternate implementation, the state flag could also be implemented as a counter, thus allowing the proxy MBR to be booted multiple times before reverting control back to the original MBR, as is well appreciated by those skilled in the art. This alternate embodiment could be used, for instance, to allow for multiple firmware updates to be queued up to occur as a series of virtual floppy service boots before rebooting to the protected mode operating system.

It should also be noted that if the state flag is set, then the BIOS can skip the MBR virus check, which is an option at POST (power-on self test) on certain systems. This would eliminate the problems which can occur today if these programs are run on a system which has the MBR virus check enabled.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. A method for detection and correction of entrance into an improper master boot record (MBR) state in a computer system, the method comprising:

providing a proxy MBR at a predetermined location on a storage device of the computer system;

restarting the computer system utilizing the proxy MBR; and utilizing an original MBR maintained at an original location on the storage device during a reboot operation when the proxy MBR utilization is unsuccessful.

2. The method of claim 1, further comprising setting a state flag in a nonvolatile storage of the computer system to direct the computer system to the predetermined location and proxy MBR.

3. The method of claim 2, further comprising resetting the state flag during the restart operation.

4. The method of claim 3, wherein the reset state flag directs the reboot operation to the original location and original MBR.

5. The method of claim 1, wherein the proxy MBR further comprises a modified version of the original MBR.

6. A computer system capable of detection and correction of entrance into an improper master boot record (MBR) state, the computer system comprising:

a mass storage device storing an original MBR at a first location and a proxy MBR at a second location;

a device storing at least one state flag; and a processor coupled to the mass storage device and the device, the processor directing a boot operation with the proxy MBR when the at least one state flag is set and directing a reboot operation with the original MBR when the boot operation is unsuccessful.

7. The computer system of claim 6, wherein the device further comprises a nonvolatile memory device.

8. The computer system of claim 6, wherein the processor directs the reboot operation with the original MBR when the state flag is reset.

9. The computer system of claim 6, wherein the proxy MBR further comprises a modified version of the original MBR.

10. A computer readable medium containing a computer program for detection and correction of entrance into an improper master boot record (MBR) state in a computer system, the computer program comprising program instructions for:

providing a proxy MBR at a predetermined location on a storage device of the computer system;

restarting the computer system utilizing the proxy MBR; and utilizing an original MBR maintained at an original location on the storage device during a reboot operation when the proxy MBR utilization is unsuccessful.

11. The computer readable medium of claim 10, wherein the computer program further comprises program instructions for setting a state flag in a nonvolatile storage of the computer system to direct the computer system to the predetermined location and proxy MBR.

12. The computer readable medium of claim 11, wherein the computer program further comprises program instructions for resetting the state flag during the restart operation.

13. The computer readable medium of claim 12, wherein the reset state flag directs the reboot operation to the original location and original MBR.

14. The computer readable medium of claim 10, wherein the proxy MBR further comprises a modified version of the original MBR.

15. A method for detection and correction of entrance into an improper master boot record (MBR) state in a computer system, the method comprising:

setting a state flag in a nonvolatile storage device of the computer system;

providing a proxy MBR, the proxy MBR being stored on a mass storage device at a location separate from an original MBR also being stored on the mass storage device;

directing a boot operation during a computer system restart to the location of the proxy MBR when the state flag is set;

resetting the state flag during the computer system restart;

determining if the computer system restart is successful with the proxy MBR; and rebooting the computer system when the computer system restart is unsuccessful, the reboot being directed to the original MBR based on the reset state flag.

16. A computer readable medium containing a computer program for detection and correction of entrance into an improper master boot record (MBR) state in a computer system, the computer program comprising program instructions for:

setting a state flag in a nonvolatile storage device of the computer system;

providing a proxy MBR, the proxy MBR being stored on a mass storage device at a location separate from an original MBR also being stored on the mass storage device;

directing a boot operation during a computer system restart to the location of the proxy MBR when the state flag is set;

resetting the state flag during the computer system restart;

determining if the computer system restart is successful with the proxy MBR; and rebooting the computer system when the computer system restart is unsuccessful, the reboot being directed to the original MBR based on the reset state flag.

* * * * *